United States Patent
Kim et al.

[11] Patent Number: 6,060,147
[45] Date of Patent: May 9, 2000

[54] PROCESS FOR PREPARING A CARBON FIBER-REINFORCED COMPOSITE MATERIAL HAVING A MORPHOLOGY GRADIENT

[75] Inventors: Sung-Chul Kim, Seoul; Yu-Seung Kim, Taejon, both of Rep. of Korea

[73] Assignee: Korea Advanced Institute of Science and Technology, New York, N.Y.

[21] Appl. No.: 08/978,993

[22] Filed: Nov. 26, 1997

[30] Foreign Application Priority Data

Nov. 27, 1996 [KR] Rep. of Korea .................... 96-58183

[51] Int. Cl.$^7$ ........................................ H01B 1/06
[52] U.S. Cl. .................. 428/113; 428/114; 428/334; 428/335; 428/413; 428/414; 428/408
[58] Field of Search ..................... 428/113, 114, 428/334, 335, 413, 414, 408; 264/255, 257; 427/133

[56] References Cited

U.S. PATENT DOCUMENTS 4,604,319   8/1986   Evans et al. .
5,132,052   7/1992   Cobbledick et al. .................... 252/511

FOREIGN PATENT DOCUMENTS 0 274 899 A2   7/1988   European Pat. Off. .

OTHER PUBLICATIONS

S. Zeng et al. (1986) Particulate Interlayer Toughening of Dicyanate Matrix Composites, Polymer Composites, 114:458–466 (1993).

*Primary Examiner*—Richard Weisberger
*Attorney, Agent, or Firm*—Darby & Darby

[57] ABSTRACT

The present invention relates to a carbon fiber-reinforced composite material having a high toughness against delamination, which is prepared by regulating the rate of cure reaction of a thermosetting resin used as a matrix and the rate of dissolving a toughening agent in the matrix to form a morphology gradient depending on a concentration gradient of the toughening agent between layers of the carbon composite material. A process for preparing the carbon fiber-reinforced composite material which comprises the steps of: obtaining a thermosetting resin in a melted or solution form, and adding a catalyst of the thermosetting resin to obtain a prepreg; adding a toughening agent between plies within the prepreg thus impregnated, in a form of film having a uniform thickness or in a form of powder having a uniform distribution; and, curing under a proper reaction temperature and pressure, by autoclave vacuum bag molding method or compression molding method. The carbon fiber-reinforced composite material of the invention has a higher toughness against delamination than the conventional ones, and still has a thermostability and a chemical resistance to solvent or acid which is one of advantages of a thermosetting matrix, while improving a weight penalty phenomenon which is a disadvantage of a conventional interleaved system.

9 Claims, 1 Drawing Sheet

PROCESS FOR PREPARING A CARBON FIBER-REINFORCED COMPOSITE MATERIAL HAVING A MORPHOLOGY GRADIENT

FIELD OF THE INVENTION

The present invention relates to a carbon fiber-reinforced composite material having a morphology gradient, more specifically, to a carbon fiber-reinforced composite material having a high toughness against delamination, which is prepared by regulating the rate of cure reaction of a thermosetting resin used as a matrix and the rate of dissolving a toughening agent in the matrix to form a morphology gradient depending on a concentration gradient of the toughening agent between layers of the carbon composite material.

BACKGROUND OF THE INVENTION

A thermosetting resin such as an epoxy resin and a dicyanate resin has been widely used as a matrix of a carbon fiber-reinforced composite material, owing to its high thermostability, high chemical resistance to solvent or acid, high interfacial adhesive strength and wetting property against carbon fibers, and good manufacturing property. However, a carbon fiber-reinforced composite material employing the thermosetting resin as a matrix, due to its weak brittleness, has a shortcoming that separation may occur between plies of the matrix by exterior impact or fatigue("delamination"). Naturally, the delamination phenomenon has been the chief obstacles to use the carbon fiber-reinforced composite material as a primary structural material.

As a promising solution for the delamination phenomenon, a method for addition of rubber material or thermoplastic polymer to a thermosetting matrix resin to accomplish toughening of a matrix resin using an additive of uniformly dispersed form(about 0.1–5 $\mu$m), which is formed by phase separation in a cure reaction, has been employed in the art(see: U.S. Pat. No. 3,472,730). The method are, however, proven to be less satisfactory in a sense that a toughness of the carbon fiber-reinforced composite material is less improved than that of a matrix resin itself.

Therefore, in order to solve the delamination phenomenon, an interleaved system that adhesive films or powder particles of a high toughness are added to a prepreg prior to cure reaction, has been developed in the art. For example, toughness of a carbon composite material against delamination can be improved by adding an elastomer of rubber material or thermoplastic resin between plies in a film form (see; U.S. Pat. No. 4,539,253; U.S. Pat. No. 4,604,319) or by adding a toughening agent between plies in a particle form(see: EP 0 274 899). However, the interleaved system has caused a weight penalty phenomenon that modulus and strength against volume of total laminate plates decrease, compared with a laminate plate having the same volume, since the adhesive films remain still between plies after cure reaction.

Recently, Murakami et al. added a toughening agent, polyimide in 10, 20 and 30 weight % to a carbon composite material which comprises an epoxy resin as a matrix, and measured a toughness against delamination(see: Murakami, A. et al., J. Adhesion, 39:227–242(1992)). As a result, it was found that: a sea-island morphology is formed when polyimide of 10 weight % is added; and, a nodular morphology is formed when polyimide of 20 or more weight % is added. Also, once the nodular morphology is formed, a toughess against delamination is not increased even though increased amount of toughening agent is added.

In addition, Johnston et al., prepared a carbon composite material having a concentration gradient within a matrix by employing thermosetting polyimide and thermoplastic polyimide, and measured its mechanical property and toughness against delamination(see: 37th International SAMPE symposium, N. J. Johnston et al., March 9–12, pp.690–704 (1992)). As a result, it was found that the concentration gradient of polyimide between layers of the carbon composite material allows to have a slightly increased chemical resistance and a toughness against delamination. However, it was revealed that the concentration gradient of polyimide in a single phase does not give a satisfactory toughening effect.

SUMMARY OF THE INVENTION

In this regard, the present inventors have made an effort to solve the problems of the prior art, and prepared a carbon fiber-reinforced composite material having a morphology gradient in a matrix resin, by adding a toughening agent of thermoplastic material or rubber material which is dissolved in the matrix resin, between layers of prepregs, and regulating rate of cure reaction with a catalyst. The carbon fiber-reinforced composite material thus prepared has a high toughness against delamination and a high chemical resistance, while improving a weight penalty phenomenon which is a disadvantage of an interleaved system of prior art.

A primary object of the present invention is, therefore, to provide a process for preparing a carbon fiber-reinforced composite material having a morphology gradient.

The other object of the invention is to provide a carbon fiber-reinforced composite material prepared by the said process.

BRIEF DESCRIPTION OF DRAWINGS

The above and the other objects and features of the present invention will become apparent from the following description given in conjunction with the accompanying drawings, in which.

DETAILED DESCRIPTION OF THE INVENTION

Figure 1:
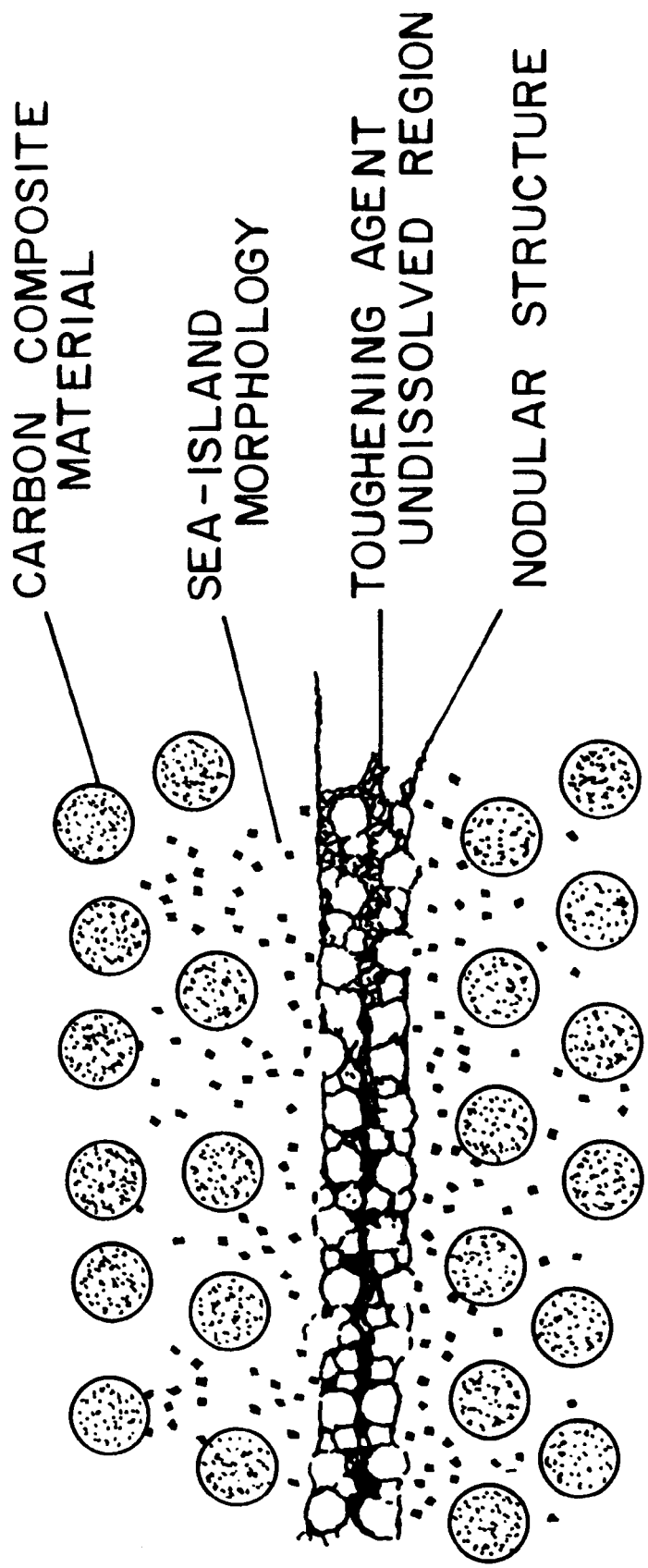
FIG. 1 is an enlarged cross-sectional view of a carbon fiber-reinforced composite material having a morphology gradient.

A process for preparing a carbon fiber-reinforced composite material having a morphology gradient of the present invention comprises the steps of:

Step 1: Obtaining of Prepreg

A thermosetting resin used as a matrix resin is made in a melted or solution form, and a prepreg is obtained according to the conventional impregnation method of carbon composite material, by the addition of known catalyst of the thermosetting resin. In this connection, the matrix resin includes all kinds of thermosetting resin such as epoxy, phenol, dicyanate, unsaturated polyester and bis maleimide, which may be used with the conventional curing agents and catalysts, and can dissolve a toughening agent which is added in the next step, to accomplish a morphology gradient within a matrix. Also, the catalyst includes zinc stearate and zinc octoate, which is added in a quantity of 200 to 600 ppm against total weight of the thermosetting resin and reacted with the resin under a reaction temperature of 175 to 210° C.

Step 2: Addition of Toughening Agent

A toughening agent is added between plies of the prepreg thus impregnated, in a form of film having a uniform thickness or in a form of powder having a uniform distribution. In this connection, the toughening agent is selected so that it can be dissolved in a monomer or oligomer of the thermosetting agent employed in step 1, which includes thermosetting resins having a high toughness and a thermostability such as polyamide, polyimide, polyether, polysulphone and polyethersulphone, and rubber materials of amine or carboxyl-terminated butadiene acrylnitrile compounds, and mixtures thereof When a large quantity of the toughening agent is added between plies within the prepreg, the carbon fiber composite material of the invention cannot be prepared due to the presence of layers comprising remaining undissolved toughening agent. When the toughening agent is added in a very small quantity, a morphology gradient within the matrix cannot be accomplished. Therefore, tile toughening agent is added in a quantity of 1 to 40 weight %, more preferably 1 to 25 weight %, against that of a matrix resin.

Step 3: Curing

To prepare a carbon fiber-reinforced composite material having a morphology gradient, curing is carried out under a proper reaction temperature and pressure of −10 to 400° C., more preferably 100 to 300° C., and 0.1 to 2 MPa, most preferably 0.7 MPa, respectively, by the aid of autoclave vacuum bag molding method or compression molding method, in accordance with the known cure cycle of the used thermosetting resin. In this connection, the cure cycle may be modified, considering a dissolving rate of the toughening agent.

In accordance with the present invention, the morphology gradient is formed by regulating the rate of cure reaction of a thermosetting resin used as a matrix and the rate of dissolving a toughening agent in the matrix. To prepare a carbon fiber-reinforced composite material having a morphology gradient, careful consideration should be made, on the kind and quantity of catalyst, and reaction temperature, which are critical factors for determining the reaction rate of a matrix resin and the time taken to reach gel point as well.

At the early stage of reaching the gel point, the toughening agent located between layers is dissolved in the matrix resin, and a proper concentration gradient of the dissolved toughening agent is formed, depending on the location of the agent, and a morphology gradient is formed in the carbon fiber-reinforced composite material. However, when the reaction rate of a matrix resin becomes very high by the factors of catalyst or reaction temperature, the toughening agent remains in an undissolved state, which results in the formation of separate layers, and the carbon fiber composite material having a morphology gradient cannot be prepared. Accordingly, the kind and quantity of catalyst, and reaction temperature should be selected properly, depending on the dissolving rate of a toughening agent.

In general, the said thermosetting/thermoplastic blend has been known as a semi-interpenetrating polymer network, whose morphology changes according to the composition of such a blend (see: D. J. Hourton et al., Polym. Inter., 25:17(1981)). In summary, the presence of thermoplastic components in a low composition ratio of below 10–15 weight %, causes a sea-island morphology that the thermoplastic components form a dispersion phase of spherical type; the presence of the thermoplastic components in a high composition ratio of 20–25 weight % or more, causes a nodular structure that the thermoplastic components form a continuous phase and the thermosetting components form a nodule, respectively; and, a co-presence of nodular/sea-island morphology is obtained, when the thermoplastic components are present in a range of 10–25 weight %.

The matrix morphology gradient which is formed between plies of the carbon fiber-reinforced composite material of the present invention is schematically depicted in FIG. 1. Referring to FIG. 1, a morphology gradient is formed in order between layers of the carbon composite material; that is, a toughening agent-undissolved region where undissolved toughening agents remain still; a nodular structure formed by high presence of dissolved toughening agent; a nodular/sea-island morphology co-presence region; and, a sea-island morphology formed by low presence of dissolved toughening agent. The carbon fiber-reinforced composite material of the invention, in addition to the said morphology gradient, may have a morphology gradient which is formed by only a nodular structure, a nodular/sea-island morphology co-presence region and a sea-island morphology.

The carbon fiber-reinforced composite material having such a morphology gradient has following characteristics:

(1) In a toughening agent-undissolved layer or a nodular structure formed in a matrix region of ply of the carbon fiber-reinforced composite material, the toughening agent plays a role of improving toughness of the composite material against delamination. A sea-island morphology in a matrix region near carbon fibers permits a high interfacial adhesiveness between carbon fibers and a matrix resin and an increased toughness of a matrix resin itself. Accordingly, the carbon fiber-reinforced composite material has a toughness against delamination much higher than the conventional ones.

(2) A sea-island morphology, a continuous phase of a thermosetting resin, is present on the surface of the carbon fiber-reinforced composite material, which allows a chemical resistance to solvent or acid which is one of advantages of a thermosetting matrix.

(3) A toughening agent added is dissolved in the course of curing, and the toughening agent-layer of a thin structure, unlike the conventional interleaved system, is formed, which improves a weight penalty phenomenon that modulus and strength against the volume of total laminate plates decrease The present invention is further illustrated by the following examples, which should not be taken to limit the scope of the invention.

EXAMPLE 1

In order to prepare a carbon fiber-reinforced composite material, polyether imide was first dissolved in a solvent of dichloride methane, to obtain a polyether imide solution of 10 weight %. Then, the solution thus obtained was poured onto a clean glass plate, and films of 0.015, 0.045 and 0.075 mm were obtained using a doctor blade. And then, remaining solvent was evaporated at 50° C. for 2 hours. On the other hand, a dicyanate resin was left to stand for 90 minutes in an air-circulated oven maintained at 210° C. to prepare a prepolymer having a turnover rate of 0.58. The prepolymer was dissolved in a solvent of dichloride methane at room temperature to obtain a solution of 35 weight %, and 500 ppm of zinc stearate, a catalyst of zinc family was added and stirred for complete dispersion. Then, carbon fibers of woven state were impregnated, and dried for 24 hours at room temperature and dried again for 30 minutes is in an air-circulated oven maintained at 90° C. to give them a character of tack.

The prepreg thus prepared was cut in a Constant size (150×200 mm) and the polyether imide films of various thickness obtained above were inserted between plies of the prepreg. Then, 10 sheets of prepregs were laminated in order. The laminated prepregs were cured at 175° C. for 6 hours according to autoclave vacuum bag molding method, and post-cured for 90 minutes in an air-circulated oven maintained at 280° C.

It was investigated whether the carbon fiber-reinforced composite material thus prepared forms a morphology gradient as in FIG. 1, and its toughness against delamination was also measured, whose results were summarized in Table 1 below. In this connection, toughness of the carbon fiber-reinforced composite material was determined by critical strain energy release rates of mode I and mode II, i.e., $G_{IC}$ and $G_{IIC}$, according to the following equations (I) and (II) below by beam theory(see: ASTM STP 775, 168–183 (1982); ASTM STP 876, 349(1985)):

$$G_{IC}=P^2/2W(dC/da) \quad (I)$$

wherein,

P is power applied to the sample;

C is compliance represented as $\delta/P$(where, $\delta$ is displacement);

a is length of crack; and, w is width of sample.

$$G_{IIC}=9P^2Ca^2/\{2W(2L^3+3a^3)\} \quad (II)$$

wherein,

P is power applied to the sample;

C is compliance represented as $\delta/P$(where, $\delta$ is displacement);

a is length of crack;

w is width of sample; and,

L is length of tie bar.

TABLE 1

Critical strain energy release rate of the carbon fiber-reinforced composite material

| Content of polyether imide within a matrix (weight %) | $G_{IC}$ (J/m$^2$) | $G_{IIC}$ (J/m$^2$) | Formation of morphology gradient (Yes/No) |
|---|---|---|---|
| 5 | 922 | 1018 | Yes |
| 15 | 1437 | 1440 | Yes |
| 20 | 2182 | 1403 | Yes |

EXAMPLE 2

A carbon fiber-reinforced composite material was prepared in the same manner as in Example 1, except that 300 ppm of a zinc stearate catalyst was added, and $G_{IC}$ and $G_{IIC}$ were determined. The results were summarized in Table 2 below.

TABLE 2

Critical strain energy release rate of the carbon fiber-reinforced composite material

| Content of polyether imide within a matrix (weight %) | $G_{IC}$ (J/m$^2$) | $G_{IIC}$ (J/m$^2$) | Formation of morphology gradient (Yes/No) |
|---|---|---|---|
| 5 | 907 | 1020 | Yes |
| 15 | 1307 | 1440 | Yes |
| 20 | 1868 | 1424 | Yes |

EXAMPLE 3

A carbon fiber-reinforced composite material was prepared in the same manner as in Example 1, except that catalyst was not added, and $G_{IC}$ and $G_{IIC}$ were determined. The results were summarized in Table 3 below.

TABLE 3

Critical strain energy release rate of the carbon fiber-reinforced composite material

| Content of polyether imide within a matrix (weight %) | $G_{IC}$ (J/m$^2$) | $G_{IIC}$ (J/m$^2$) | Formation of morphology gradient (Yes/No) |
|---|---|---|---|
| 5 | 753 | 600 | No |
| 15 | 766 | 1090 | No |
| 20 | 1141 | 1130 | Yes |

Comparative Example 1

According to the conventional method for solvent impregnation, dicyanate prepolymer prepared in the same manner as in Example 1 and polyether imide of the same composition as in Example 1, were dissolved in a solvent of dichloride methane to obtain a solution of 35 weight %. Then, carbon fibers of woven state were impregnated and dried for 24 hours at room temperature and dried again for 30 minutes in an air-circulated oven maintained at 90° C., to give them a character of tack.

The prepreg thus prepared was cut in a constant size(150× 200 mm) and 10 sheets of plies were laminated in order. Then, they were cured at 175° C. for 6 hours according to autoclave vacuum bag molding method, and post-cured for 90 minutes in an air-circulated oven maintained at 280° C.

It was investigated whether the carbon fiber-reinforced composite material thus prepared forms a morphology gradient, and its toughness against delamination Was measured. The results were summarized in Table 4 below.

TABLE 4

Critical strain energy release rate of the carbon fiber-reinforced composite material prepared by the conventional method

| Content of polyether imide within a matrix (weight %) | $G_{IC}$ (J/m$^2$) | $G_{IIC}$ (J/m$^2$) | Formation of morphology gradient (Yes/No) |
|---|---|---|---|
| 0 | 399 | 360 | No |
| 5 | 624 | 605 | No |
| 15 | 810 | 1060 | No |
| 20 | 898 | 1170 | No |

As can be seen Examples 1 to 3 and Comparative Example 1, it was found that the carbon fiber-reinforced composite material of the invention having a morphology gradient has a higher toughness against delamination than the conventional ones which do not have a morphology gradient.

As clearly illustrated and demonstrated above, the present invention provides a process for preparing a carbon fiber-reinforced composite material having a morphology gradient which has a higher toughness against delamination than the conventional ones, and still has a thermostability and a chemical resistance to solvent or acid which is one of advantages of a thermosetting matrix, while improving a weight penalty phenomenon which is a disadvantage of an interleaved system.

What is claimed is:

1. A process for preparing a carbon fiber-reinforced composite material which comprises the steps of:

providing a dicyanate thermosetting resin in a melted or solution form, adding a catalyst in a quantity of 200 to 600 ppm of the total weight of the thermosetting resin, and reacting the catalyst with the resin under a reaction temperature of 175 to 210° C. to obtain a prepreg;

adding a toughening agent in a quantity of 1 to 40 weight % of the thermosetting resin between plies of the prepreg in a form of film having a uniform thickness or in a form of powder having a uniform distribution; and curing the plies with the toughening agent at a temperature and pressure of −10 to 400° C. and 0.1 to 2 MPa, respectively.

2. The process for preparing a carbon fiber-reinforced composite material of claim 1, wherein the catalyst is zinc stearate or zinc octoate.

3. The process for preparing a carbon fiber-reinforced composite material of claim 1, wherein the toughening agent is at least one of a thermoplastic polymer and rubber material.

4. The process for preparing a carbon fiber-reinforced composite material of claim 1, wherein a morphology gradient is formed by regulating the rate of cure reaction of the thermosetting resin used as a matrix and the rate of dissolving the toughening agent dissolved in the matrix.

5. A carbon fiber-reinforced composite material having a morphology gradient prepared by the process of claim 1, where a toughening agent-undissolved region, a nodular structure, a nodular/sea-island morphology co-presence region, and a sea-island morphology are formed in order between layers of the carbon composite material.

6. The process for preparing a carbon fiber-reinforced composite material as in claim 1 when the curing step comprises autoclave vacuum bag molding or compression molding.

7. The process as in claim 3 wherein the thermoplastic polymer is selected from the group consisting of polyamide, polyimide, polyether, polysulphone and polyethersulphone.

8. The process as in claim 3 wherein the rubber material is selected from the group consisting of amine and carboxyl-terminated butadiene acrylnitrile compounds.

9. A carbon fiber-reinforced composite material having a morphology gradient where a nodular structure, a nodular/sea-island morphology co-presence region, and a sea-island morphology are formed in order between layers of the carbon composite material.

* * * * *